United States Patent [19]

Piller

[11] 3,870,519

[45] Mar. 11, 1975

[54] S-TRIAZINE DERIVATIVES AS ULTRAVIOLET PROTECTING AGENTS

[75] Inventor: Bernhard Piller, Marly, Switzerland

[73] Assignee: Ciba-Geigy AG, Basel, Switzerland

[22] Filed: Jan. 14, 1974

[21] Appl. No.: 433,429

Related U.S. Application Data

[62] Division of Ser. No. 262,855, June 14, 1972, Pat. No. 3,845,049.

[30] Foreign Application Priority Data

June 23, 1971 Switzerland.......................... 9167/71

[52] U.S. Cl....................... 96/51, 96/53, 96/84 R, 96/109, 96/50 PL, 252/300, 260/248 CS, 260/249.5

[51] Int. Cl............................................... G03c 1/84

[58] Field of Search........ 260/248 CS, 249.5, 249.9; 252/300; 96/84 R, 50 PL, 51, 53, 109

[56] References Cited

UNITED STATES PATENTS

| | | | |
|---|---|---|---|
| 3,450,872 | 6/1969 | Taylor................................ | 260/946 |
| 3,676,471 | 7/1973 | Eggensperger et al. ......... | 260/410.5 |
| 3,758,309 | 9/1973 | Bailey et al. ....................... | 96/84 R |

Primary Examiner—Norman C. Torchin
Attorney, Agent, or Firm—Joseph G. Kolodny; Edward McC. Roberts; Prabodh I. Almaula

[57] ABSTRACT

The present invention relates to new s-triazine derivatives. A benzene ring is bound in its 1-position directly to the triazine ring, in its 2-position to an optionally further substituted hydroxy group and in its 4-position to the hydrocarbon radical of a phosphonic acid. The s-triazine derivatives are useful to stabilise and protect organic materials, which are damaged by ultraviolet rays.

15 Claims, No Drawings

S-TRIAZINE DERIVATIVES AS ULTRAVIOLET PROTECTING AGENTS

This is a division of application Ser. No. 262,855, filed on June 14, 1972, now U.S. Pat. No. 3,485,049.

The present invention relates to new s-triazine derivatives, processes for their manufacture and the use of these s-triazine derivatives for protecting organic materials against ultraviolet radiation.

The new s-triazine derivatives correspond to the formula (I) 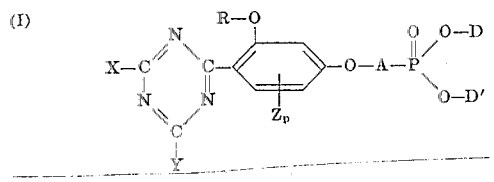

wherein X and Y independently of one another each denote an unsubstituted or substituted alkyl radical, an alkenyl, cycloalkyl or aralkyl radical or an unsubstituted or substituted monocyclic or bicyclic, aromatic or heterocyclic radical, which is bonded directly or via a divalent heteroatom grouping to the s-triazine ring, A denotes a hydrocarbon radical, D and D' either both denote a hydrogen atom, a cycloalkyl radical, an alkenyl radical or an unsubstituted or substituted alkyl or phenyl radical, or one denotes hydrogen and the other denotes a cycloalkyl radical, an alkenyl radical or an unsubstituted or substituted alkyl or phenyl radical, R denotes a hydrogen atom or the group

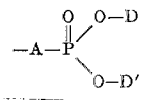

wherein A, D and D' have the abovementioned meanings, Z denotes a halogen atom, an RO group, wherein R is defined as above, an alkyl or alkoxy radical, a phenylalkyl radical or the phenyl radical and $p$ is 0, 1 or 2.

The new s-triazine derivatives are above all suitable for protecting organic materials, especially photographic materials, against ultraviolet radiation.

Cycloalkyl radicals D and D' preferably contain 5 or 6 ring members. Alkenyl radicals D and D' as a rule contain 3 to 24 carbon atoms, whilst the preferred branched or especially unbranched alkyl radicals D and D' can contain 1 to 26 carbon atoms.

Possible substituents of alkyl radicals X, Y, D and D' are, for example, halogen atoms, such as fluorine, chlorine, bromine and iodine, hydroxyl groups, alkoxy groups, such as methoxy, ethoxy, propoxy, isopropoxy, n-butoxy and secondary or tertiary butoxy groups; phenoxy or phenyl groups or nitro, amino or acylamino groups.

Possible monocyclic or bicyclic, aromatic radicals X and Y are naphthalene, diphenyl or preferably benzene radicals. Such radicals can be substituted by halogen atoms or hydroxyl, alkyl, alkoxy, cycloalkyloxy, phenyl or phenoxy groups, and the alkyl and alkoxy groups can possess 1 to 24 carbon atoms. The alkyl, alkoxy, phenyl and phenoxy groups can in turn be substituted further, for example by hydroxyl, nitro, amino, acylamino, alkyl, alkoxy or aryl groups, and alkyl or alkoxy groups can contain 1 to 18, preferably 1 to 4, carbon atoms.

Possible substituents of the X and Y radicals are thus also aralkyl or aralkoxy radicals, such as benzyl, phenethyl, benzyloxy or phenethoxy radicals.

Heterocyclic radicals X and Y are preferably monocyclic 5-membered or 6-membered radicals such as pyridine, furane or thiophene radicals which can be substituted further, for example by halogen atoms or hydroxyl, alkyl, alkoxy cycloalkoxy, phenyl or phenoxy groups.

Possible alkyl and alkoxy radicals Z are those with at most 24, preferably 1 to 8, especially 1 to 4, carbon atoms, and possible phenylalkyl radicals Z are, for example, benzyl and phenethyl radicals, preferably benzyl radicals. Possible divalent hetero-atom groupings which can join the radicals X and Y and the s-triazine ring are, for example, —O—, —S— and —NH— groupings.

Preferred s-triazine derivatives correspond to the formula (II) 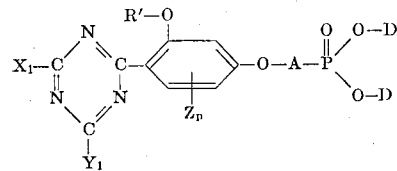

wherein A, D, Z and p have the abovementioned meanings, $X_1$ denotes a monocyclic or bicyclic aromatic radical which is bonded directly or via a divalent heteroatom grouping to the s-triazine ring, $Y_1$ denotes a monocyclic or bicyclic, aromatic radical or a monocyclic, heterocyclic radical, bonded directly or via a divalent hetero-atom grouping to the s-triazine ring and R' denotes a hydrogen atom or the radical

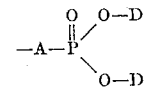

wherein A and D have the abovementioned meanings.

s-Triazine derivatives of particular interest are those of the formula (III) 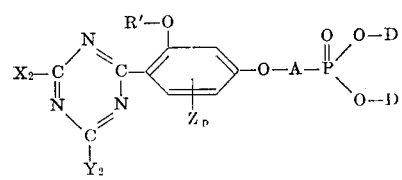

wherein A, D, R', Z and p have the abovementioned meanings and $X_2$ and $Y_2$ independently of one another each denote an unsubstituted or substituted phenyl radical bonded directly or via a —9—, —S— or —NH— bridge to the s-triazine ring.

s-Triazine derivatives which have proved particularly suitable are those of the formula (IV) 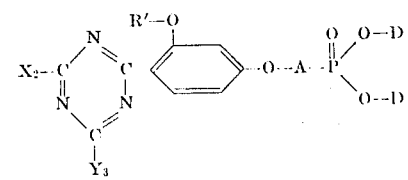

wherein A, D and R' have the abovementioned meanings and $X_3$ and $Y_3$ independently of one another each denote an unsubstituted phenyl radical directly bonded to the s-triazine ring or denote a phenyl radical substituted by halogen atoms, hydroxyl groups, substituted alkyl radicals, unsubstituted alkyl or alkenyl, alkoxy, alkenyloxy, cycloalkoxy, phenyl or phenoxy radicals.

s-Triazine derivatives of particular interest are those of the formula

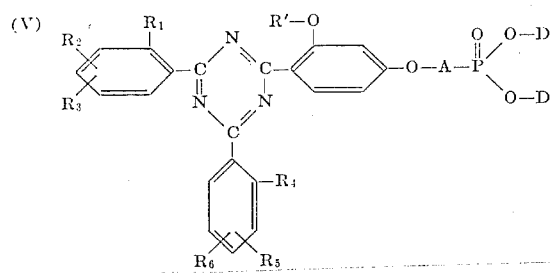

wherein A, D and R' have the abovementioned meanings and $R_1$ to $R_6$ each represent a hydrogen or halogen atom, a hydroxyl radical, an alkyl radical with 1 to 4 carbon atoms which is unsubstituted or substituted by halogen atoms, hydroxyl groups or alkoxy groups, or an alkoxy radical with 1 to 8 carbon atoms which is unsubstituted or substituted by halogen atoms, hydroxyl groups or alkoxy groups, and $R_2$, $R_3$, $R_5$ and $R_6$ additionally each represent a phenyl or phenoxy radical which is unsubstituted or substituted by halogen atoms, nitro groups or amino, monoalkylamino or dialkylamino or acylamino groups or alkyl or alkoxy radicals with 1 to 4 carbon atoms or each represent a cycloalkoxy radical with 5 or 6 ring members or the radical

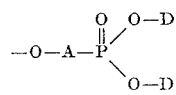

wherein A and D have the abovementioned meanings.

Advantageous properties are shown by s-triazine derivatives of the formula

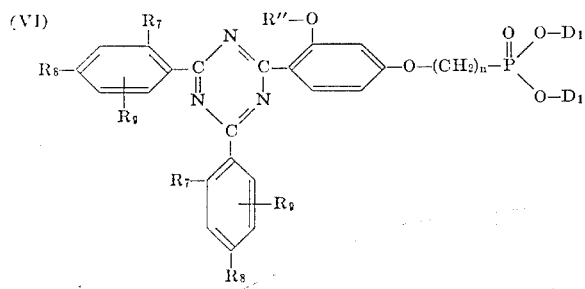

wherein $D_1$ represents a hydrogen atom, an alkyl radical with 1 to 16 carbon atoms or the phenyl radical, $n$ represents an integer from 1 to 12; $R_7$, $R_8$ and $R_9$ each represent a hydrogen atom, a hydroxyl radical or an alkyl radical with 1 to 4 carbon atoms, $R_8$ and $R_9$ additionally each represent a chlorine atom and $R_8$ also represents the radical

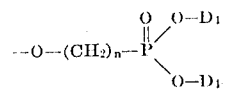

and R'' represents a hydrogen atom or the radical

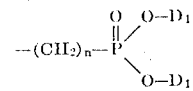

with $D_1$ and $n$ having the abovementioned meanings.

s-Triazine derivatives which have proved particularly suitable are those of the formula

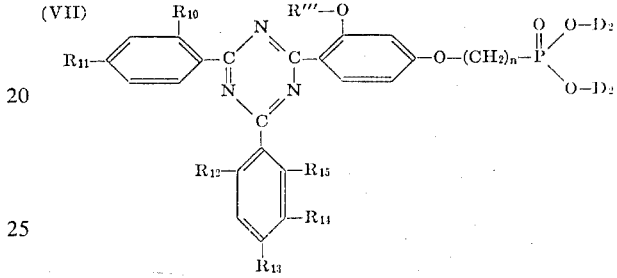

wherein $n$ has the abovementioned meaning, $D_2$ represents an alkyl radical with 1 to 8 carbon atoms, $R_{10}$ represents a hydrogen atom, the methyl radical or the hydroxyl group, $R_{11}$ represents a hydrogen atom, the methyl radical or the radical

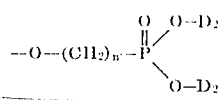

wherein $n$ and $D_2$ have the abovementioned meanings, $R_{12}$ and $R_{15}$ each represent a hydrogen atom or the methyl radical, $R_{13}$ represents a hydrogen or chlorine atom or the methyl radical and $R_{14}$ represents a hydrogen or chlorine atom and R''' represents a hydrogen atom or the radical

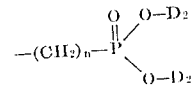

with $D_2$ and $n$ having the abovementioned meanings, those of the formula (VIII)

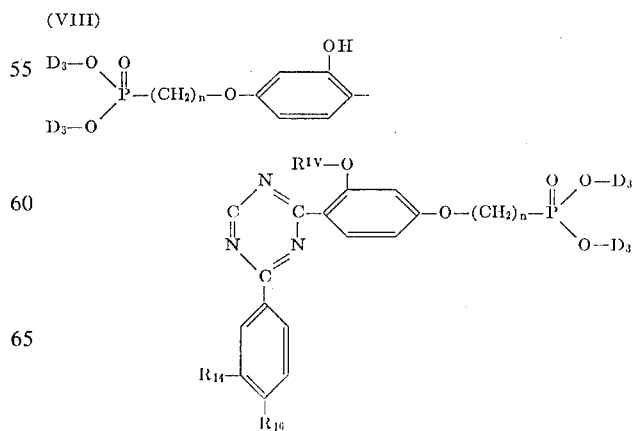

wherein $n$ has the abovementioned meaning, $D_3$ denotes an alkyl radical with 1 to 4 carbon atoms, $R_{14}$ and $R_{16}$ each denote a hydrogen atom or a chlorine atom and $R^{IV}$ denotes a hydrogen atom or the radical

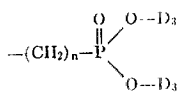

with $D_3$ and $n$ having the abovementioned meanings, and those of the formula (IX)

(IX)

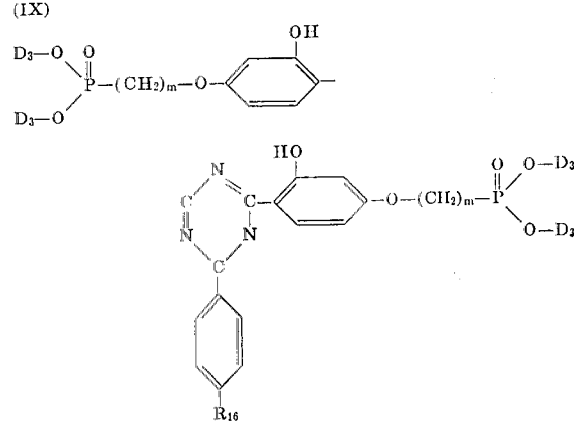

wherein $D_3$ and $R_{16}$ have the abovementioned meanings and $m$ represents an integer from 2 to 5. s-Triazine derivatives of, for example, the formulae (X) and (XI) are very particularly interesting.

(X)

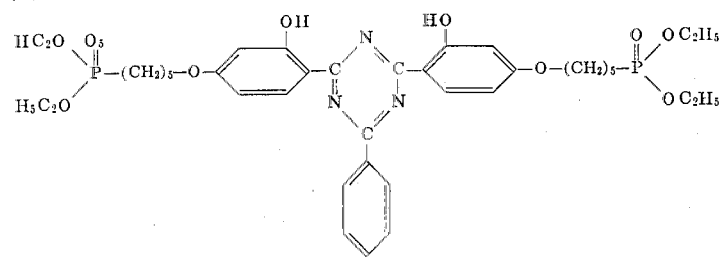

(XI)

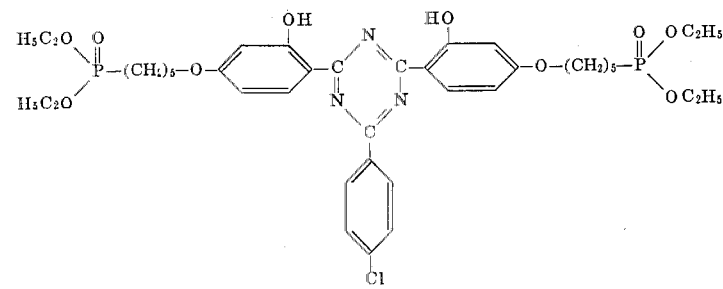

Unless —O—D and —O—D′, or both —O—D or both —O—D₁ are ester groups, the compounds of the formulae (I) to (VI) can not only be in the form of their free acids, that is to say with $H_2O_3P$ end groups, but also in the form of salts. Thus, for example, they can be wholly or partly in the form of metal salts, such as alkali metal salts or alkaline earth metal salts or ammonium salts. Ammonium salts can optionally also be N-substituted. The form in which the compounds of the formulae (I) to (VI) are present depends greatly on the conditions under which they separate out during manufacture, for example on the chosen $p_H$ value or on the cation which is present in the salt used for separating out the product. The acid groups can thus be in the form of —PO₃H or —PO₃-cation groups, such as —PO₃HNa, —PO₃Na₂, —PO₃K₂, —PO₃Li₂, —PO₃(NH₄)₂, —PO₃Ca or —PO₃Ba. Of course, amines and other customary metals can also be present as cations.

Equally, hydroxyl groups present as substituents can be in the form of alcoholates.

The radical of the formula (1) 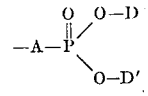

in the formula (I) is derived, for example, from compounds of the formula (2) 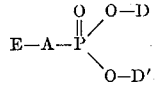

wherein E denotes a hydroxyl group or a nucleofugic group which is removed, for example a halogen atom or a sulphonate group of the formula $$E'—SO_2—O—$$

(3)

wherein E′ represents an optionally substituted alkyl or aryl radical, for example from bromomethanephosphonic acid, 2-fluoroethanephosphonic acid, 2-chloroethanephosphonic acid, 2-bromoethanephosphonic acid, 2-iodoethanephosphonic acid, 3-bromopropanephosphonic acid, 4-bromobutanephosphonic acid 5-bromopentanephosphonic acid, 6-bromohexanephosphonic acid, 8-bromooctanephosphonic acid, 10-bromodecanephosphonic acid, 12-bromododecanephosphonic acid, 16-bromohexadecanephosphonic acid, 5-bromo-3-methylpentanephosphonic acid, 4-bromo-2-butenephosphonic acid, $F_3C—SO_2—O—(CH_2)_2PO_3H_2, H_3C—SO_2—O—(CH_2)_2PO_3H_2$,

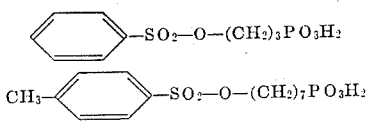

and 9-hydroxynonanephosphonic acid.

The radical of the formula

  (4)

in the formula (1) is derived, for example, from phosphites of the formula

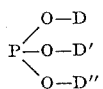  (5)

wherein D'' has the meaning indicated for D or D', for example from trimethylphosphite, triethylphosphite, tripropylphosphite, tributylphosphite, trihexylphosphite, tribenzylphosphite and triphenylphosphite.

If the radicals D or D' in the formula (1) or the radicals D, D' or D'' in the formula (5) represent organic radicals having the indicated meaning, they are derived from compounds of the formulae (6a) HO—D;

(6b) HO—D' or (6c) HO—D'' such as, for example: methanol, 1-propanol, 1-hexanol, 1-decanol, 1-tetradecanol, 1-octadecanol, 2-propanol, 2-octanol, 2-methyl-2-propanol, 3-chloro-1-propanol, ethylene glycol, ethylene glycol monoisopropyl ether, ethylene glycol monophenyl ether, 3-methoxy-1-butanol, benzyl alcohol, 2-phenyl-ethanol, oleyl alcohol, 3-fluorophenol, 2-chlorophenol, 4-methoxyphenol, 2-amino-4-iodophenol, 2,4,5-trimethyl-phenol, 4-tert.-butoxyphenol, ethanol, 1-butanol, 1-octanol, 1-dodecanol, 1-hexandecanol, 1-hexacosanol, 2-butanol, 3-octanol, 2-ethyl-1-hexanol, 3-bromo-1-propanol, ethylene glycol monomethyl ether, ethylene glycol mono-4-chlorophenyl ether, cyclohexanol, 1-phenyl-ethanol, allyl alcohol, α-3,7-dimethyl-1,6-octadien-3-ol, 3-methylphenol, 4-bromo-2-nitrophenol, 3-dimethylaminophenol and 3-acetylaminophenol.

Radicals of the formula

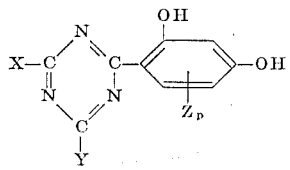  (7)

wherein X, Y, Z and p have the indicated meanings are derived, for example, from the triazine derivatives indicated in Table I below. Q in Table I corresponds to the radical

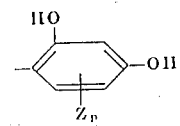

TABLE I

| X | Y | Q |
|---|---|---|
| —CH₃ | —CH₃ | ![benzene with OH and HO] |
| —CF₃ | —CH₂CH₃ | ![benzene with OH, HO, HO] |
| —CH₂—CH=CH₂ | ![cyclohexyl] | ![benzene with F, Cl, OH, HO] |
| —O—CH₂—[phenyl] | —O—[cyclopentyl] | ![benzene with Br, CH₃, OH, HO] |
| —OCH₃ | ![benzene with OH, HO] | ![benzene with OH, HO] |
| ![benzene with CH₃, CH₃] | ![benzene with CH₃, CH₃] | Same as above. |
| ![benzene with OH, HO] | ![benzene with OH, HO] | Do. |

3,870,519
TABLE I—Continued
| X | Y | Q |
|---|---|---|
| 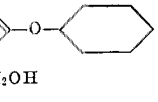 | 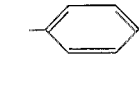 | 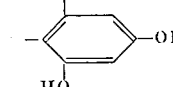 |
| 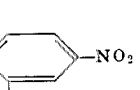 | 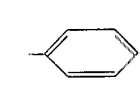 | 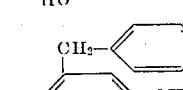 |
| 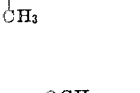 |  | 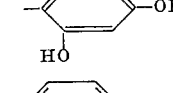 |
| 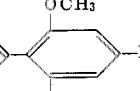 | 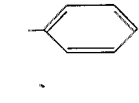 | 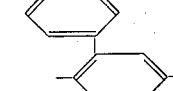 |
| 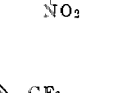 | 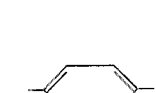 | 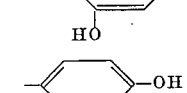 |
| 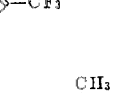 | 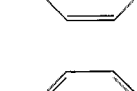 | Same as above. |
| 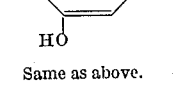 | 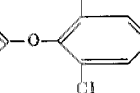 | Do. |
| 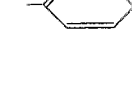 | 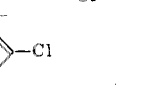 | Do. |
| 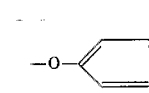 | | |
| Same as above |  | Do. |
| Do | 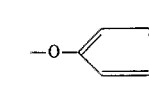 | Do. |
| —OCH₂CH₂OCH₂CH₃ | 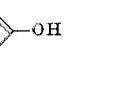 | Do. |
| —OCH₂Br | —S—(CH₂)₃CH₃ | Do. |
| 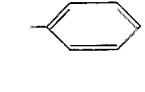 | —NH—CH₃ | Do. |
| 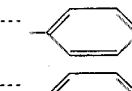 | —NH—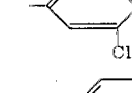—Cl | Do. |
| 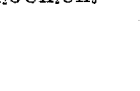 | 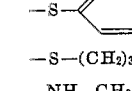 | Do. |
| 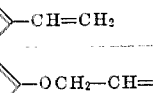 | 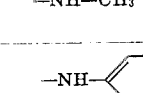 | Do. |
| 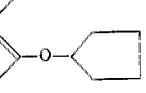 | 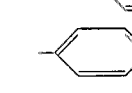 | Do. |
| 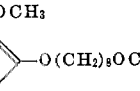 | —S—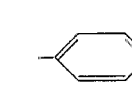—Cl | Do. |

TABLE I—Continued

| X | Y | Q |
|---|---|---|
| naphthyl-CH₃ | naphthyl | Do. |
| -O-(furan/thiophene) | thiophene-CH₃ | Do. |
| furan/thiophene | thiophene-phenyl | Do. |
| -NH(CH₂)₁₇CH₃ | pyridyl | Do. |

Manufacture

The s-triazine derivatives of the formula (I) can be manufactured according to various processes which are in themselves known. Depending on the nature and quantity ratios of the starting products and on the reaction conditions, compounds of the formula (8) 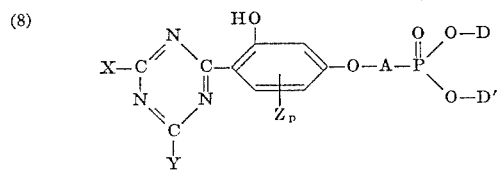

or (9) 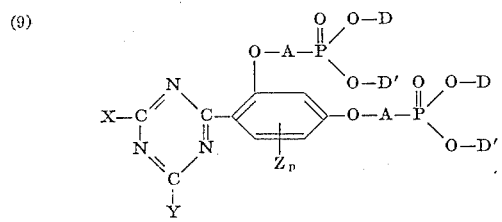

or mixtures thereof are obtained.

A.1. One such process is characterised, for example, in that a phenol of the formula

(10) 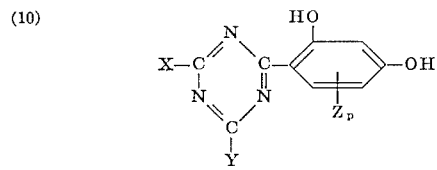

is reacted with an alcohol of the formula

(11) 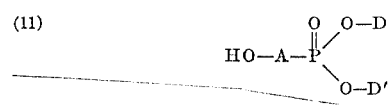

wherein X, Y, Z, A, D, D' and p have the indicated meanings. This reaction is appropriately carried out in the presence of an agent which splits off water or of a Lewis acid, such as concentrated sulphuric acid, dicyclohexylcarbodiimide, zinc chloride, tin tetrachloride or boron trifluoride. A.2. Instead of an alcohol of the formula (11) it is also possible to use a phostonate of the formula

(12) 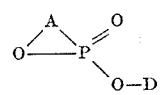

in which case an agent which splits off water is superfluous.

B.1. A further process is characterised in that a compound of the formula (10) is reacted with a sulphuric acid ester of the formula

(13) 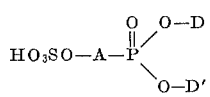

or

(14) 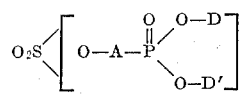

wherein A, D and D' have the indicated meanings.

B.2. Conversely, it is also possible to react a compound of the formula (11) with a sulphuric acid ester of the formula

(15) 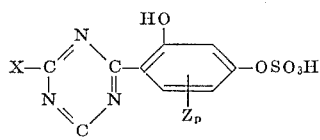

(16) 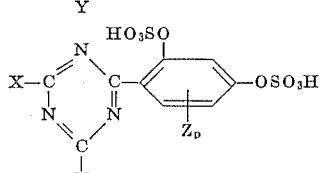

or

(17) 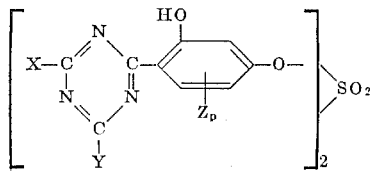

C.1. A further process consists of reacting a compound of the formula (10) with a compound of the formula

(18) 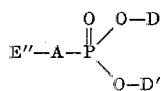

wherein E" represents a nucleofugic group which is split off, for example a halogen atom, preferably a bromine atom, or a radical of the formula —$SO_3E'$, wherein E' denotes an optionally substituted alkyl or aryl radical, for example a radical of the formula —$SO_3CF_3$,

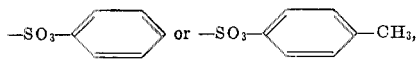

and A, D and D' have the indicated meanings. Compounds of the formula

(19) 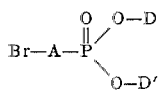

can be obtained, for example, in a known manner by reaction of dibromo derivatives of the formula Br—A—Br with alkyl phosphites or aryl phosphites. (See, for example, Belgian Patent No. 568,840, Am. Soc. 66, 1511 (1944) or Am. Soc. 70, 1971 (1948)).

C.2. Conversely, it is also possible to react a compound of the formula

(20) 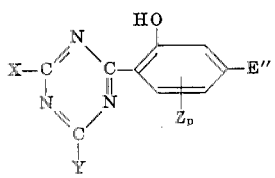

or

(21) 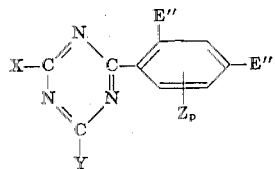

with a compound of the formula (11).

The reactions according to B. and C. take place according to methods which are in themselves known and are advantageously carried out in an organic solvent, preferably in an organic solvent which is suitable for nucleophilic substitutions, such as acetone, methyl ethyl ketone, acetonitrile, dimethylformamide, dimethylsulphoxide, nitromethane or sulpholane.

In this reaction it may be of advantage to work in the presence of acid-binding agents such as, for example, alkali hydroxides or alkali carbonates.

D. Products of the formula (I), wherein D and D' denote hydrogen atoms, can also be obtained if an ester of the formula (I), wherein D and/or D' do not represent hydrogen atoms but otherwise have the indicated meaning, is hydrolysed directly or via the corresponding acid chloride to give the acid.

This reaction is carried out in an alkaline or, appropriately, in an acid medium, advantageously in the presence of a strong inorganic acid such as hydrobromic acid.

The acids of the formula (I) can also be obtained by reduction of esters of the formula (I).

E. The esters of the formula (I), wherein D and/or D' do not represent a hydrogen atom but otherwise have the indicated meaning can also be obtained if a compound of the formula (I), wherein D and/or D' represent a hydrogen atom, is esterified in the usual manner.

F. Trans-esterifications of esters of the formula (I) are also possible, preferably in the presence of a trans-esterification catalyst, for example p-toluenesulphonic acid, or an alkali alcoholate, such as sodium methylate.

The compounds of the formulae (10) to (21) can also be in the form of salts or alcoholates and be employed in this form.

Using the compounds of the formula (I) it is possible, in principle, to stabilise and protect all those organic materials which are damaged in any form, or destroyed, by the influence of ultraviolet rays. Such damage through the action of the same cause, namely ultraviolet radiation, can have very diverse effects, for example colour change, change in the mechanical properties (brittleness, crazing, tensile strength, flexural strength, abrasion resistance, elasticity and ageing), the initiation of undesirable chemical reactions (decomposition of sensitive chemical substances, for example medicines, photochemically induced rearrangements, oxidation and the like, for example of oils containing unsaturated fatty acids), the initiation of burning symptoms and irritations (for example in the case of human skin) and many others. The use of the s-triazine derivatives defined above for the protection of polycondensation products and polyaddition products against the action of ultraviolet is of preferred significance. In addition, a whole series of the compounds defined above also displays a stabilising effect towards the action of oxygen and heat, and antistatic properties, alongside the said ultraviolet protection effect.

The organic materials to be protected can be in the most diverse states of processing and states of aggregation, whilst their conjoint characteristic is sensitivity towards ultraviolet radiation.

As low molecular or higher molecular substances for the protection or stabilisation of which the compounds according to the invention can be used, there may for example be mentioned - without implying a restriction thereto: organic natural substances such as are used for pharmaceutical purposes (medicaments), UV-sensitive dyestuffs and compounds which as foodstuffs or in foodstuffs are decomposed through exposure to light (unsaturated fatty acids in oils) and the like.

As examples of high molecular organic substances there may be mentioned:

I.

Synthetic organic high molecular materials such as:

a. Polymerisation products based on organic compounds containing at least one polymerisable carbon-carbon double bond, that is to say their homopolymers or copolymers as well as their after-treatment products such as, for example, crosslinking, grafting or degradation products, polymer blends, products obtained by modification of reactive groupings in the polymer molecule and the like, such as, for example, polymers based on α, β-unsaturated carboxylic acids (for example acrylic acid esters, acrylamides and acrylonitrile), on olefine hydrocarbons such as, for example, α-olefines, ethylene, propylene or dienes, that is to say, therefore, also rubbers and rubber-like polymers (also so-called ABS polymers), and polymers based on vinyl and vinylidene compounds (for example styrene, vinyl esters, vinyl chloride and vinyl alcohol), on halogenated hydrocarbons, on unsaturated aldehydes and ketones, allyl compounds and the like;

b. other polymerisation products, such as are obtainable, for example, by ring opening, for example polyamides of the polycaprolactam type, and also formaldehyde polymers, or polymers which are obtainable both through polyaddition and through polycondensation, such as polyethers, polythioethers, polyacetals and thioplasts.

c. Polycondensation products or pre-condensates based on bifunctional or polyfunctional compounds possessing groups capable of condensation, their homo-condensation and co-condensation products and after-treatment products, as examples of which there may be mentioned: polyesters [saturated (for example polyethylene terephthalate) or unsaturated (for example maleic acid/dialcohol polycondensates as well as their crosslinking products with copolymerisable vinyl monomers), unbranched or branched (also based on polyhydric alcohols, such as, for example, alkyd resins)], polyamides (for example hexamethylenediamine adipate), maleate resins, melamine resins, phenolic resins (for example novolacs), aniline resins, furane resins, carbamide resins and also their pre-condensates and products of analogous structure, polycarbonates, silicone resins and others.

d. Polyaddition products such as polyurethanes (crosslinked) and non-crosslinked and epoxide resins.

II.

Semi-synthetic organic materials such as, for example, cellulose esters and mixed esters (acetate or propionate), nitrocellulose, cellulose, ethers, regenerated cellulose (viscose and cuprammonium cellulose) or their after-treatment products, or casein plastics.

III.

Natural organic materials of animal or vegetable origin, for example based on cellulose or proteins such as wool, cotton, silk, raffia, jute, hemp, furs and hair, leather, finely divided wood compositions, natural resins (such as colophony, especially lacquer resins), glues and also rubber, guttapercha, balata and their after-treatment and modification products, degradation products and products obtainable by modification of reactive groups.

The organic materials in question, especially plastics from the class of the polymers of vinyl chloride saturated and unsaturated polyesters, celluloses and polyamides, can be in the most diverse states of processing (raw materials, semi-finished goods or finished goods) and states of aggregation. They can firstly be in the form of structures of the most diverse shape, that is to say therefore, for example, predominantly three-dimensional articles such as profiles, containers or the most diverse machined articles, chips or granules, and foams; predominantly two-dimensional articles such as coatings, films, lacquers and impregnations or predominantly one-dimensional articles such as filaments, fibres, flocks, bristles and wires. On the other hand, the said materials can also be in unshaped states, in the most diverse homogeneous and inhomogeneous forms of distribution and states of aggregation, for example as powders, solutions, normal and inverted emulsions (creams), dispersions, latices, sols, gels, putties, waxes, adhesive compositions and filling compositions and the like.

Fibre materials can be in the most diverse predominantly non-textile processing forms, for example filaments, yarns, fibre fleeces, felts, waddings or flocked structures, or be in the form of woven textile fabrics or textile laminates, knitted fabrics, paper, cardboards and the like.

The new stabilisers can, for example, also be employed as follows:

a. In cosmetic preparations, such as perfumes, coloured and non-coloured soaps and bath additives, skin creams and face creams, powders, repellents and especially sun oils and sun creams;

b. mixed with dyestuffs or pigments or as an additive to dyebaths, printing pastes, discharge pastes or resist pastes. Additionally, also for the after-treatment of dyeings, prints or discharge prints;

c. mixed with so-called "carriers," antioxidants, other light protection agents, heat stabilisers or chemical bleaching agents;

d. mixed with crosslinking agents, finishes such as starch or synthetically obtainable finishes;

e. in combination with detergents. The detergents and stabilisers can also be added separately to the wash baths to be used; ketone f. in combination with polymeric carriers (polymerisation, polycondensation or polyaddition products) which contain the stabilisers, optionally alongside other substances, in a dissolved or dispersed form, for example in the case of coating agents, impregnating agents or binders (solutions, dispersions or emulsions) for textiles, fleeces, paper and leather;

g. as additives to the most diverse industrial products in order to reduce their speed of ageing, for example as an additive to glues, adhesives, paints and the like.

Where the protective agents to be used according to the invention are intended to be employed for the treatment of textile organic materials of natural or synthetic origin, for example woven textile fabrics, they can be applied to the substrate to be protective in any stage of the final processing, such as dressing, creaseproof finishing, dyeing processes and other finishing by means of fixing processes similar to dyeing processes.

The new stabilisers to be used according to the invention are preferably added to, or incorporated in, the materials before or during their shaping. Thus, for example, they can be added to the compression moulding composition or injection moulding composition during the manufacture of films, sheets, tapes or mouldings or can be dissolved, dispersed or otherwise finely distributed in the spinning composition before spinning. The protection agents can also be added to the starting substances, reaction mixtures or intermediate prooducts for the manufacture of fully synthetic or semi-synthetic organic materials, that is to say also before or during the chemical reaction, for example in the case of a polycondensation (that is to say also to precondensates), in the case of a polymerisation (that is to say also to pre-polymers) or in the case of a polyaddition.

An important technological variant of the stabilisers to be used according to the invention is to incorporate these substances into a protective layer which protects the material located behind it. This can be done by applying the ultraviolet absorber to the surface layer of a fibre or of a multi-dimensional shaped article. This can be achieved, for example, in accordance with a kind of dyeing process, or the active substance can be embedded in a polymer (polycondensate or polyadduct) coating in accordance with surface coating methods, which are in themselves known, for polymeric substances, or the active substance can, in a dissolved form, be allowed to diffuse or swell into the surface layer, using a suitable solvent. Another important variant is to embed the ultraviolet absorber in a self-supporting essentially two-dimensional carrier material, for example a film or the wall of a container, in order therby to keep ultraviolet radiation away from the substance behind it (examples: shop windows, transparent packagings and bottles).

It is obvious from the above that in addition to the protection of the substrate or of the carrier substance which contains the ultraviolet absorber, the protection of other concomitant substances of the substrate, for example dyestuffs, antioxidants, disinfection additives, antistatic agents and other finishes, plasticisers and fillers, is simultaneously also achieved.

Depending on the nature of the substance to be protected or stabilised, on its sensitivity or on the technological form of protection and stabilisation, the requisite amount of stabiliser can vary within wide limits, for example between about 0.01 and 10 per cent by weight relative to the amount of substrate to be protected. For most practical requirements, however, amounts of about 0.05 to 2 percent suffice.

The process which follows from the above for protecting organic materials against the action of ultraviolet radiation and heat thus consists of homogeneously distributing the compounds defined above in the organic materials to be protected, incorporating them into the surface of these materials or covering the materials to be protected with a filter layer which contains the compounds indicated.

In particular, an appropriate procedure is to incorporate the compounds described above, in bulk or in a dissollved or dispersed form, in a homogeneously distributed manner into the organic materials to be protected, in amounts of 0.01 to 10, preferably 0.05 to 2.0, per cent by weight relative to the amount of the materials to be protected, before the final shaping operation.

If it is intended to accumulate the substance to be used according to the invention in the surface of the substrate to be protected, that is to say, for example, to apply it to a fibre material (fabric), then this can advantageously be effected by introducing the substrate to be protected into a liquor which contains the dissolved or dispersed UV-absorber. Suitable solvents can be, for example, methanol, ethanol, acetone, ethyl acetate, methyl ethyl ketone, cyclohexanol or water. Similarly to the case of dyeing processes, the substrate to be treated is left for a certain time - in most cases 10 minutes to 24 hours suffice - in the liquor at 10 to 120°C, during which time the liquor can be agitated. Thereafter the material is rinsed, washed if desired and dried.

It is frequently advisable to employ the abovementioned light protection agents in combination with sterically hindered phenols, esters of thiodipropionic acid or other organic phosphorous compounds.

Above all, however, the compounds of the formula (I) are suitable for protecting photographic, especially colourphotographic, material against ultraviolet light, and/or for the absorption of certain ultraviolet regions of electromagnetic radiation for photographic purposes.

The colour-photographic material which is stabilised according to the invention against the action of ultraviolet radiation can be unexposed or exposed imagewise, and partially or completely processed. Preferably, unexposed or imagewise exposed and fixed colour-photographic material is stabilised against ultraviolet radiation. This can be colour-photographic material for the colour transfer process, but preferably also for the chromogen process or a dye bleach process, especially the silver dye bleach process, or material which has been processed according to one of these processes.

The compounds to be used according to the invention, or mixtures thereof, can be incorporated in any form into the layers containing dyestuffs or dyestuff components or into coloured or colourless intermediate layers, backing layers and/or covering layers, optionally containing further components, of the colour-photographic materials to be protected.

The compounds to be used according to the invention can be incorporated into the photographic materials, or applied to them, both in the manufacture of the colour-photographic material, for example by casting into the desired layers, and also before, during or after photographic processing, for example by application in bulk, by application with the aid of a binder, for example by over-spraying with a protective lacquer, or by diffusing in from a solution, suspension or emulsion.

The following forms of incorporation of the compounds of the formula (I) are possible:

1. Incorporation into the layer-forming binder, for example in gelatine or other customary layer-forming agents such as photo-lacquers, which for example consist, inter alia, of ethylcellulose or acetylcellulose.
   1.1. Molecularly disperse solution in the binder.
   1.2. Distributed in the binder in the form of association compounds.
   1.3. As addition compounds with the binder.
   1.4. Copolymerised with the binder or a derivative thereof.
   1.5. Reactively linked to the binder; or grafted, as a pre-polymer, onto the layer-forming polymer.
   1.6 Dispersed in a finely divided form in the binder. For this it is possible to use the customary dispersing processes such as controlled precipitation from a liquid or dissolved state, grinding or emulsification of a component solution in a liquid which is immiscible with the binder or the binder solution and subsequent removal of this liquid by a washing or evaporation process. The known techniques for the manufacture of dispersions are utilised, such as, for example, the use of dispersing agents, the use of protective colloids, dispersing stirrers, continuous flow chambers and the like.
   1.7. Emulsified as a liquid, in a finely divided form, in the binder.
2. Incorporation into an auxiliary substrate analogously to 1.1 – 1.7, which is subsequently, in some form, dissolved in the binder, copolymersied with it or reactively linked to it.

Suitable substrates are, for example: water-soluble polymers based on acrylic acid and vinylpyrrolidone, polyvinyl alcohols, gelative derivatives, such as gelatine modified by reactive linking, for example to triazine derivatives; starch, polyamides and polyacrylonitrile; solvents of low volatility such as esters of dicarboxylic acids, diethyl-laurylamide, tricresyl phosphate and the like.

3. Incorporation into laminates, for example into cellulose triacetate, polyester of polycarbonate, preferably in a molecularly disperse solution.

The compounds according to the invention are distinguished by extremely favourable spectral absorption, good fastness to diffusion, high fastness to light, outstanding protective action against ultraviolet radiation, favourable rheological properties in mixtures with gelatine and, especially, exceptional solubility in dibutyl phthalate (compounds of the formula I, wherein D and D' denote an alkyl radical with 1 to 4 carbon atoms).

Compounds of particularly good solubility in dibutyl phthalate are summarised in Table II below.

TABLE II

| Formula No. according to TABLE III | Solubility in dibutyl phthalte in per cent by weight (g/100 g of mixture) |
|---|---|
| 104 | > 50 |
| 105 | > 50 |
| 107 | > 50 |
| 108 | > 50 |

Manufacturing examples

Example 1

3.7 g of 2', 4', 2'',4''-tetrahydroxy-2,4,6-triphenyl-s-triazine, 7.6 g of 5-bromopentane-phosphonic acid diethyl ester and 3.4 g of potassium carbonate in 40 ml of methyl ethyl ketone are heated to the boil for 8½ hours under reflux, whilst stirring. The reaction mixture is poured out onto 150 ml of ice-water mixture, the resulting yellow oil is twice washed with water and twice with petroleum ether and is extracted warm with 100 ml of acetone, and the solution is freed of a small amount of insoluble matter by filtration, treated with active charcoal and evaporated to dryness.

6.1 g of product of the formula (101) of Table III are obtained in the form of a light yellow, viscous liquid.

The compounds of the formulae (102) to (108), (111), (113) and (114) are obtained analogously.

Example 2

3.9 g of the ester of the formula (101) in 30 ml of 48 percent strength hydrobromic acid are heated for 4 hours to the boil under reflux and whilst stirring. 100 ml of water are added and the product is filtered off and washed with water until neutral.

The crude product thus obtained is dissolved in 50 ml of water with addition of the requisite amount of sodium hydroxide solution, and is fractionally precipitated with 35 percent strength hydrochloric acid.

1.1 g of acid of the formula (109) are obtained in the form of a yellow powder of melting point 145°C.

The compound of the formula (110) is obtained analogously.

Example 3

3.7 g of 2', 4', 2'', 4''-tetrahydroxy-2,4,6-triphenyl-s-triazine, 13.5 g of 3-bromopropane-phosphonic acid diethyl ester and 6.8 g of potassium carbonate in 50 ml of methyl ethyl ketone are heated to the boil in nitrogen, under reflux and whilst stirring, for 16 hours. The reaction mixture is poured onto 50 ml of ice-water mixture, the supernatant water is decanted off, the resulting yellow oil is washed 3 times with water and twice with petroleum ether and dissolved in 50 ml of warm acetone, and the solution is treated with active charcoal and evaporated to dryness.

1.2 g of product of the formula (112) of Table III are obtained in the form of a yellow, viscous oil.

TABLE III

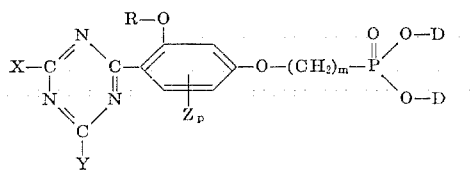

| Formula number | X | Y | p | m | D | R | Absolute maximum in DMF in [nm.] |
|---|---|---|---|---|---|---|---|
| 101 | HO—⌬—O—(CH₂)ₘ—P(=O)(O—D)(O—D) | ⌬ | 0 | 5 | CH₂CH₃ | H | 300+350 |
| 102 | Same as above | ⌬—Cl | 0 | 3 | CH₃ | H | 298+347 |
| 103 | do | ⌬ | 0 | 3 | CH₂CH₃ | H | 300+350 |
| 104 | do | ⌬—Cl | 0 | 3 | CH₂CH₃ | H | 298+345 |
| 105 | do | ⌬ | 0 | 3 | (CH₂)₃CH₃ | H | 298+345 |
| 106 | do | Same as above | 0 | 3 | CH₃ | H | 298+350 |
| 107 | do | ⌬—Cl | 0 | 5 | CH₂CH₃ | H | 300+350 |
| 108 | do | ⌬ | 0 | 5 | (CH₂)₃CH₃ | H | 300+350 |
| 109 | do | Same as above | 0 | 5 | H | H | 299+352 |
| 110 | do | ⌬—Cl | 0 | 5 | H | H | 300+353 |
| 111 | do | Same as above | 0 | 5 | (CH₂)₃CH₃ | H | 298+346 |
| 112 | do | ⌬ | 0 | 3 | CH₂CH₃ | —C₃H₆—P(=O)(OC₂H₅)(OC₂H₅) | 294+338 |

TABLE III—Continued

| Formula number | X | Y | p | m | D | R | Absolute maximum in DMF in [nm.] |
|---|---|---|---|---|---|---|---|
| 113 | HO—⟨phenyl⟩—O—(CH$_2$)$_m$—P(=O)(O—D)(O—D) | —⟨phenyl⟩— | 0 | 12 | CH$_2$CH$_3$ | H | 305+347 |
| 114 | CH$_3$—⟨phenyl⟩—CH$_3$ | CH$_3$—⟨phenyl⟩—CH$_3$ | 0 | 3 | CH$_2$CH$_3$ | H | 288+335 |
| 115 | HO—⟨phenyl⟩—O—(CH$_2$)$_m$—P(=O)(O—D)(O—D) | Cl—⟨phenyl⟩—Cl | 0 | 3 | CH$_2$CH$_3$ | H | 300+349 |

USE EXAMPLES

Example 4

A paste of 100 parts of polyvinyl chloride, 59 parts by volume of dioctyl phthalate and 0.2 part of the compound of the formula (101) is milled on a calender at 145° to 150°C to give an approximately 0.5 mm thick sheet. The polyvinyl chloride sheet thus obtained absorbs from 280 to 380 nm in the ultraviolet region.

After exposure to light in the Fadeometer, no yellowing is yet detectable after 1,000 hours.

Instead of the compound of the formula (101), one of the compounds of the formulae (102) to (108), (111) or (112) to (115) can be used with equally good success.

Example 5

A mixture of 100 parts of polypropylene and 0.2 part of one of the compounds of the formulae (101) or (103) is converted into a hide on a calender at 170°C. This hide is pressed at 230° to 240°C and a maximum pressure of 40 kg/cm2 to give a 1 mm thick sheet.

The sheets thus obtained are practically opaque to ultraviolet light in the region from 280 to 380 nm.

After an exposure in the Fadeometer for 500 hours, no reduction in the mechanical strength is observed.

Example 6

0.2 part of the compound of the formula (101) are dissolved in 1.8 parts of monostyrene and 0.5 part of a cobalt naphthenate/monostyrene solution (containing 1 percent of cobalt) is added. Thereafter, 40 parts of an unsaturated polyester resin based on phthalic acid/maleic acid/ethylene glycol in monstyrene are added and the whole is stirred for 10 minutes. After dropwise addition of 1.7 parts of a catalyst solution (methyl ethyl ketons peroxide in dimethyl phthalate), the wellmixed air-free composition is poured out between two glass plates. After about 20 minutes, the 1 mm thick polyester sheet has solidified to the point that it can be removed from the mould. It is opaque to UV light in the region from 280 to 370 nm and shows no yellowing after 1,000 hours' exposure in the Xenotest.

Instead of the compound of the formula (101) a compound of the formulae (102) to (108), (111) or (112) to (115) can also be used.

Example 7

25 g of distilled monostyrene are pre-polymerised in a closed bottle in a heating cabinet at 90°C for 2 days. 0.25 g of a compound of the formulae (101) or (103) and 0.025 g of benzoyl peroxide are then slowly stirred into the viscous mass. Thereafter, the mixture is poured into a cube-shaped mould of aluminium foil and kept at 70°C for 1 day. After complete solidification and cooling of the mass, the mould is broken apart. The block thus obtained is subsequently pressed in a hydraulic press at a temperature of 138°C and a pressure of 150 kg/cm2 to give a 1 mm thick sheet.

The polystyrene sheets thus manufactured are opaque to UV light in the region from 280 to 380 nm. On exposure in the Fadeometer, a distinct improvement in the stability to light is observable, in that polystyrene sheets which contain compounds of the abovementioned formulae show no yellowing on an exposure of 200 hours, whilst sheets without these additives have already yellowed.

Example 8

0.1 g of a compound of the formulae (101) or (103) is dissolved in 40 g of clear nitro lacquer (25 percent strength). The lacquer is then uniformly applied, with a coating knife, to sheets of maple wood, and is completely dry after a short time. The addition of the abovementioned ultraviolet absorbers to the lacquer does not change the colour shade of the wood. The light colour shade of the lacquered wood remains unchanged even after several days exposure under a UV lamp provided the lacquer contains the above compounds in a concentration of about 1 percent. Untreated wood already darkens after a few days under the exposure conditions indicated.

Similar results are obtained when using acrylic resin or alkyd-melamine resin lacquers.

Example 9

10,000 parts of a polyamide in chip form, manufactured from caprolactam in a known manner, are mixed with 30 parts of the compounds of the formulae (101) or (103) in a tumbler vessel for 12 hours. The chips treated in this way are fused in a kettle heated to 300°C after displacing the atmospheric oxygen by superheated steam and the melt is stirred for half an hour. Thereafter it is extruded under nitrogen of 5 atmospheres gauge pressure through a spinneret and the filament spun in this way and cooled is wound up on a spinning bobbin, which at the same time causes stretching.

As a result of the addition of the above compounds, the degradation of the macromolecules caused on exposure in the Fadeometer and determined by measurement of the relative viscosity in concentrated sulphuric acid is substantially repressed.

Other compounds listed in the table also behave similarly.

Example 10

95 g of compound of the formula (101) are dissolved in 110 g of dibutyl phthalate on a water bath. This solution is subsequently dispersed and diluted, by means of a colloid mill, in a mixture of 200 g of an aqueous 8 percent strength solution of sodium alkylnaphthalenesulphonate and 1,600 g of a 12.5 percent strength gelatine solution.

The dispersion is subsequently cast on a transparent cellulose triacetate strip in such a way that after drying the film produced in this way has an optical density of 1.5 for light of 350 mm wavelength.

The strip is then treated for 6 minutes with a commercially available p-methylaminophenol sulphate/hydroquinone developer.

Thereafter the strip is immersed for 4 minutes in a stop-fixing bath of the following composition:

| | |
|---|---|
| ammonium thiosulphate | 200 g |
| Sodium sulphite | 15 g |
| Sodium acetate trihydrate | 25 g |
| Glacial acetic acid | 13 g |
| Water to make up to | 1,000 ml |

After soaking for 2 minutes, the strip is treated for 6 minutes with solution of the following composition:

| | |
|---|---|
| 37% strength hydrochloric acid | 70 ml |
| Potassium bromide | 50 g |
| Thiourea | 80 g |
| 2-Amino-3-hydroxyphenazine | 5 mg |
| Water to make up to | 1,000 ml |

Thereafter the strip is soaked for 2 minutes and is subsequently immersed in a silver bleach bath of the following composition:

| | |
|---|---|
| Potassium ferricyanide | 75 g |
| Potassium bromide | 15 g |
| Primary sodium phosphate monohydrate | 10 g |
| Sodium acetate trihydrate | 5 g |
| Glacial acetic acid | 10 ml |
| Water to make up to | 1,000 ml | and 0.9 ml of a 1 percent strength solution of the product of the formula (109) are pipetted into a test tube and made up to 10.0 ml with deionised water.

This solution is vigorously mixed and kept for 5 minutes at 40°C in a water bath.

The casting solution, at 40°C, is cast onto a 13 × 18 cm substrated glass plate. After solidification at 10°C, the plate is dried in a drying cabinet with circulating air at 32°C. The optical density of the filter thus manufactured is 1.0 for light of 350 nm wavelength.

On treatment in photographic processing baths, the optical density remains unchanged. A similar result is obtained when using the compound of the formula (110).

Example 12

12 mg of the compound of the formula (107) are mixed with 6.6 ml of 6 percent strength aqueous gelatine solution whilst being treated with an ultrasonic instrument. 1.0 ml of a 1 percent strength aqueous solution of the hardener of the formula (201) is added and the mixture is made up to 10.0 ml with deionised water.

The mixture is then cast onto a 13 × 18 cm substrated glass plate, and dried, as indicated in Example 11.

An optical density of 1.0 for light of 350 nm wavelength results, which remains unchanged on treatment according to Example 10.

Instead of the compound of the formula (107), one of the compounds according to the invention of the formulae (101), (108) or (111) can also be used.

Example 13

A silver bromide emulsion sensitive to red, which contains the cyan dyestuff of the formula

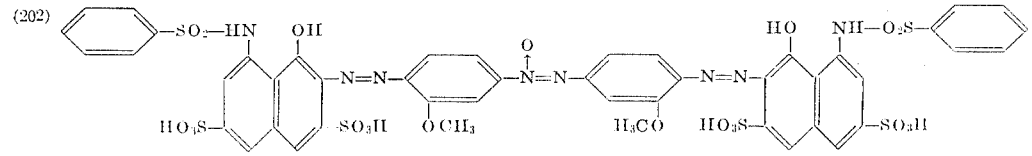

is cast on a transparent carrier.

Strips are cut from the light-sensitive material thus produced and are coated with a dispersion, described in Examples 10 to 12, of a compound according to the invention from Table III. Only a gelatine solution is applied to a strip which serves as a comparison sample.

After undergoing the photographic processing method described in Example 10, all strips show the same colour density, measured with red light.

The strips are then exposed for 150 hours by means of a Xenon lamp. A comparison of the optical densities before and after this exposure provides a measure of the improvement in the fastness to light as a result of the protective layer applied. The results are summarised in Table IV below.

Instead of the compounds listed in the Table IV, it is also possible to use one of the remaining compounds listed in the Table III.

Similar results are also obtained on using other dyestuffs customary in silver dye bleach photography, colour transfer photography or chromatogenic photography.

After 2 minutes, the strip is soaked for 2 minutes and again treated for 4 minutes with the stop-fixing bath already described. Thereafter the strip is soaked and dried. After undergoing the photographic processing method described, the optical density of the strip is unchanged at 1.5 for light of 350 nm wavelength.

Similar results are obtained when using one of the compounds of the formulae (102) to (108) or (111) to (115) listed in the Table III.

Example 11

3.3 ml of 6 percent strength aqueous gelatine solution, 2.0 ml of a 1 percent strength aqueous solution of the hardener of the formula

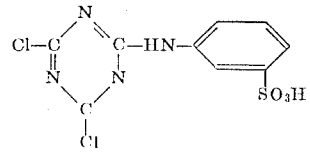

TABLE IV

| Protective layer according to Example No. | With compound of the formula No. | $D_{max}$ of the dyestuff before exposure | $D_{max}$ of the dyestuff after exposure | $-\Delta D_{max}$ (decrease in $D_{max}$ in %) | Improvement in fastness to light, in %: $1 - \frac{\Delta D_{max}\%}{46\%}$ |
|---|---|---|---|---|---|
| *) | *) | 1.00 | 0.54 | 46 | *) |
| 10 | 101 | 1.00 | 0.82 | 18 | 61 |
| 11 | 103 | 1.00 | 0.78 | 22 | 52 |
| 12 | 107 | 1.00 | 0.74 | 26 | 43 |

*) Comparison sample (gelatine without stabiliser)

Example 14

0.2 g of compound of the formula (104) is dissolved in 100 ml of a commercially available photographic lacquer, for example "CIBA-Photolacquer." This mixture is applied onto a hardened gelatine layer located on a carrier and containing the dyestuff of the formula (202) in a maximum density of 1.00, in such a way that the protective layer has an optical density of 1.0 at 350 nm. In the case of the CIBA-Photolacquer this corresponds to a layer thickness of approx. 20μ.

After 150 hours' exposure with a Xenon lamp, the protective action, calculated according to Example 13, in comparison to a lacquer layer not containing any stabilizer, is found to be 54 percent.

Similar results are obtained on using one of the remaining compounds listed in the Table III, of the formulae (101) to (103), (105) to (108), (111) or (112) to (115).

Example 15

Ektachrome daylight transparency material exposed to white light and developed in the usual manner is provided with a protective layer produced according to Example 10 and containing the compound of the formula (101) (test sample). A sample of the same makeup but not containing the compound of the formula (101) serves for comparison purposes (blank sample). Thereafter, both samples are exposed to a Xenon lamp for 48 hours. Before and after the exposure, the filter densities for red, green and blue light (R, G and B) are measured with a GRETAG D 33 Densitometer. The results are listed in Table V.

TABLE V

| Filter density | | | |
|---|---|---|---|
| Before irradiation | Test sample | B: 1.62<br>G: 1.66<br>R: 1.42 | |
| | Blank sample | B: 1.61<br>G: 1.65<br>R: 1.42 | |
| After irradiation | Test sample | B: 1.17<br>G: 1.56<br>R: 1.24 | |
| | Blank sample | B: 0.98<br>G: 1.50<br>R: 1.20 | |
| Improvement in fastness to light resulting from the compound of the formula (101), according to the equation: $1 - \frac{\Delta D \text{ in \% of the test sample}}{\Delta D \text{ in \% of the blank sample}}$ | | B: 28%<br>G: 34%<br>R: 16% | |

What we claim is:

1. Process for protecting organic material against ultraviolet radiation, which comprises incorporating into the material or applying to it an s-triazine derivative of the formula (I) 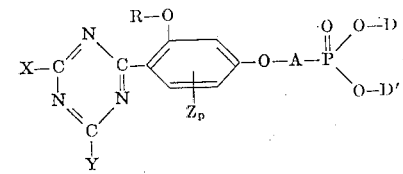

wherein X and Y independently of one another each represents an unsubstituted or substituted alkyl radical, an alkenyl, cycloalkyl or aralkyl radical or an unsubstituted or substituted monocyclic or bicyclic, aromatic or heterocyclic radical, which is bonded directly or via a divalent heteroatom grouping to the s-triazine ring, A represents a hydrocarbon radical, D and D' either both represent a hydrogen atom, a cycloalkyl radical, an alkenyl radical or an unsubstituted or substituted alkyl or phenyl radical, or one represents hydrogen and the other represents a cycloalkyl radical, an alkenyl radical or an unsubstituted or substituted alkyl or phenyl radical, R represents a hydrogen atom or the group

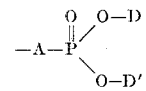

wherein A, D and D' have the above-mentioned meanings, Z represents a halogen atom, an RO group, wherein R is defined as above, an alkyl or alkoxy radical, a phenylalkyl radical or the phenyl radical and p is 0, 1 or 2.

2. Process as claimed in claim 1 which comprises incorporating or applying an s-triazine derivative according to claim 1, of the formula

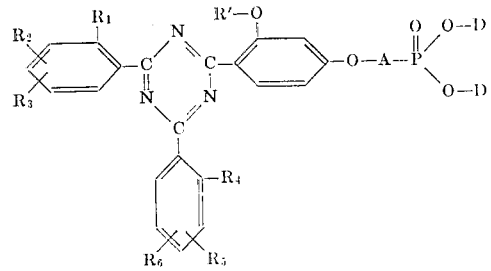

wherein A and D have the meanings indicated in claim 14, R' represents a hydrogen atom or the radical

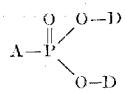

wherein A and D have the above-mentioned meanings, $R_1$ to $R_6$ each represent a hydrogen or halogen atom, a hydroxyl radical, an alkyl radical with 1 to 4 carbon atoms which is unsubstituted or substituted by halogen atoms, hydroxyl groups or alkoxy groups, or an alkoxy radical with 1 to 8 carbon atoms which is unsubstituted or substituted by halogen atoms, hydroxyl groups or alkoxy groups, and $R_2$, $R_3$, $R_5$ and $R_6$ additionally each represent a phenyl or phenoxy radical which is unsubstituted or substituted by halogen atoms, nitro groups or amino, monoalkylamino or dialkylamino or acylamino groups or alkyl or alkoxy radicals with 1 to 4 carbon atoms, or each represent a cycloalkoxy radical with 5 or 6 ring members or the radical.

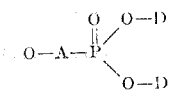

wherein A and D have the above-mentioned meanings.

3. Process as claimed in claim 1 which comprises incorporating or applying on s-triazine derivative according to claim 14 of the formula

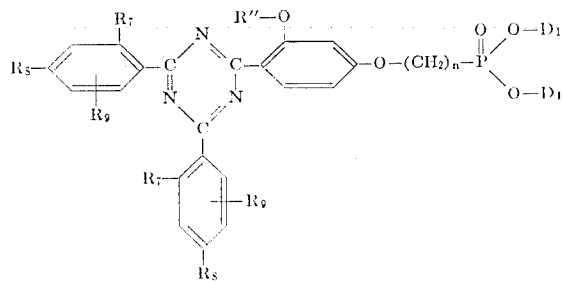

wherein $D_1$ represents a hydrogen atom, an alkyl radical with 1 to 16 carbon atoms or the phenyl radical, $n$ represents an integer from 1 to 12, $R_7$, $R_8$ and $R_9$ each represent a hydrogen atom, a hydroxyl radical or an alkyl radical with 1 to 4 carbon atoms, $R_8$ and $R_9$ additionally each represent a chlorine atom and $R_8$ also represents the radical

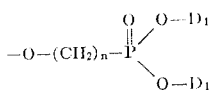

and R'' represents a hydrogen atom or the radical

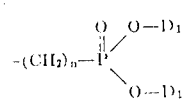

with $D_1$ and $n$ having the above-mentioned meanings.

4. Process as claimed in claim 1 which comprises incorporating or applying an s-triazine derivative according to claim 1 of the formula

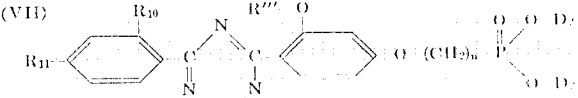

wherein $n$ represents an integer from 1 to 12, $D_2$ represents an alkyl radical with 1 to 8 carbon atoms, $R_{10}$ represents a hydrogen atom, the methyl radical or the hydroxyl group, $R_{11}$ represents a hydrogen atom, the methyl radical or the radical

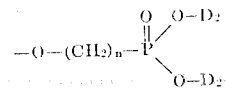

wherein $n$ and $D_2$ have the above-mentioned meanings, $R_{12}$ and $R_{15}$ each represent a hydrogen atom or the methyl radical, $R_{13}$ represents a hydrogen or chlorine atom or the methyl radical and $R_{14}$ represents a hydrogen or chlorine atom and R''' represents a hydrogen atom or the radical

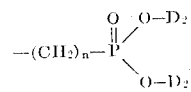

with $D_2$ and $n$ having the above-mentioned meanings.

5. Process as claimed in claim 1 which comprises incorporating or applying an s-triazine derivative according to claim 14 of the formula

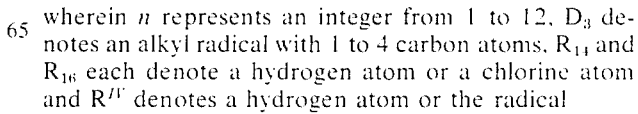

wherein $n$ represents an integer from 1 to 12, $D_3$ denotes an alkyl radical with 1 to 4 carbon atoms, $R_{14}$ and $R_{16}$ each denote a hydrogen atom or a chlorine atom and R''' denotes a hydrogen atom or the radical

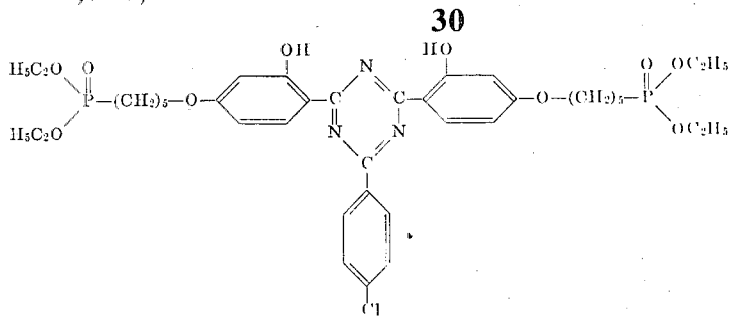

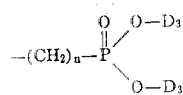

with *n* and $D_3$ having the above-mentioned meanings.

6. Process as claimed in claim 14 which comprises incorporating or applying an s-triazine derivative according to claim 14 of the formula

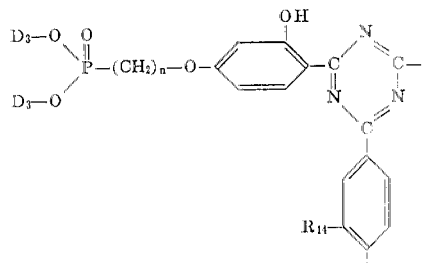

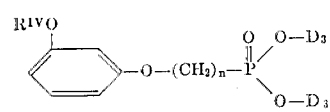

wherein $D_3$ represents an alkyl radical with 1 to 4 carbon atoms $R_{16}$ represents a hydrogen atom or a chlorine atom and *m* represents an integer from 2 to 5.

7. Process as claimed in claim 1 which comprises incorporating or applying the s-triazine derivative of the formula

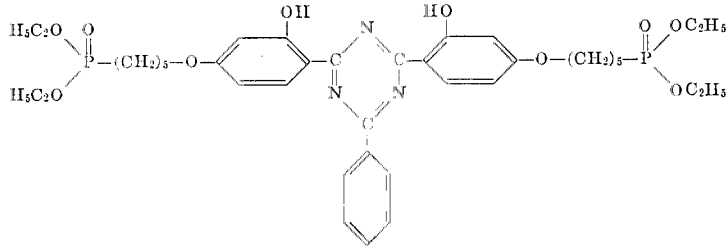

8. Process as claimed in claim 1 which comprises incorporating or applying the s-triazine derivative of the formula 9. Process according to claim 1 which comprises incoroporating into photographic material or applying to it an s-triazine derivative of the composition given in claim 1.

10. Process according to claim 1 which comprises incorporating into color photographic material or applying to it an s-triazine derivative of the composition given in claim 1.

11. Process according to claim 1 which comprises incorporating into silver dye bleach photographic material or applying to it an s-triazine derivative of the composition given in claim 1.

12. Process according to claim 1 which comprises applying to image-wise exposed and fixed color-photographic material an s-triazine derivative of the composition given in claim 1.

13. Photographic material protected against ultraviolet radiation by an s-triazine derivative of the composition indicated in claim 1.

14. Color photographic material protected against ultraviolet radiation by an s-triazine derivative of the composition indicated in claim 1.

15. Silver dye bleach photographic material protected against ultraviolet radiation by an s-traizine derivative of the composition indicated in claim 1.

* * * * *

UNITED STATES PATENT OFFICE
CERTIFICATE OF CORRECTION

PATENT NO. : 3,870,519

DATED : March 11, 1975

INVENTOR(S) : Bernhard Piller

It is certified that error appears in the above-identified patent and that said Letters Patent are hereby corrected as shown below:

Column 27, line 2, delete "14" and insert -- 1 -- ;

Column 27, line 33, delete "14" and insert -- 1 --;

Column 28, line 45, delete "14" and substitute -- 1 --;

Column 28, Claim 5, delete the following structure

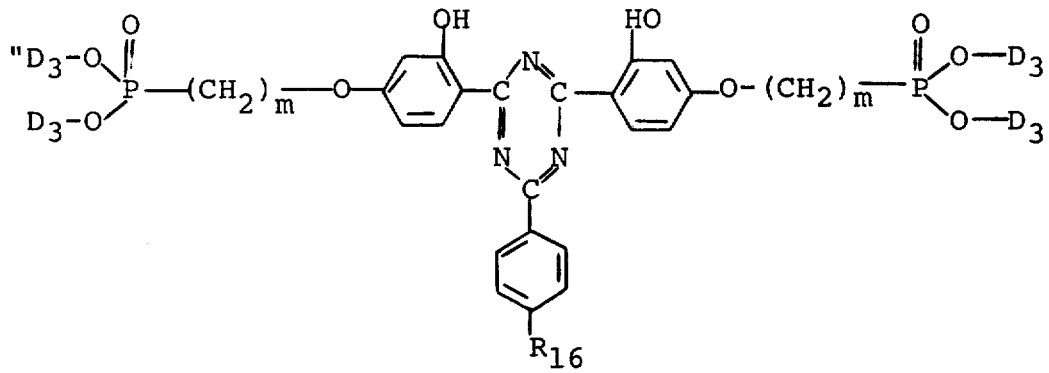

and substitute the following structure

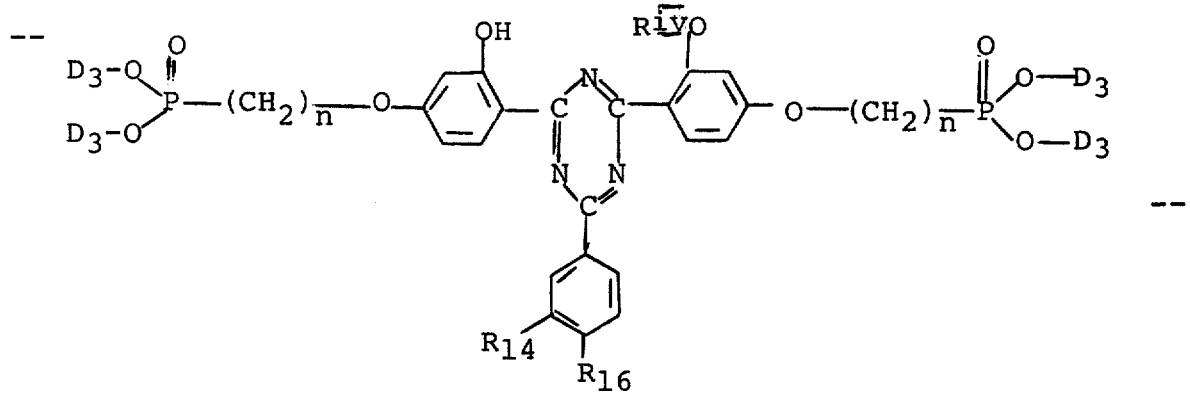

UNITED STATES PATENT OFFICE
CERTIFICATE OF CORRECTION

PATENT NO. : 3,870,519
DATED : March 11, 1975
INVENTOR(S) : Bernhard Piller

It is certified that error appears in the above-identified patent and that said Letters Patent are hereby corrected as shown below:

Column 29, claim 6, lines 1 and 3 delete "14" and insert

-- 1 --- claim 6 in the structural formula delete the following:

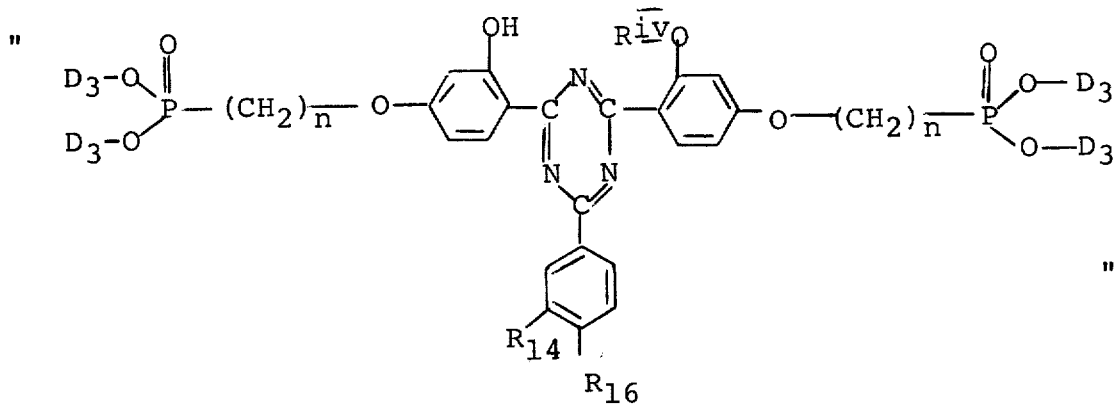

and substitute the following

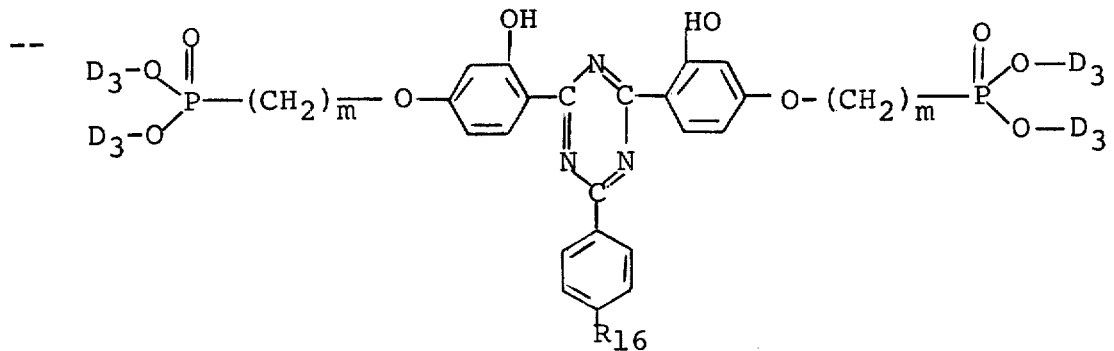

Signed and Sealed this tenth Day of February 1976

[SEAL]

Attest:

RUTH C. MASON
Attesting Officer

C. MARSHALL DANN
Commissioner of Patents and Trademarks